(12) United States Patent
Komai et al.

(10) Patent No.: US 7,731,999 B2
(45) Date of Patent: Jun. 8, 2010

(54) FAT COMPOSITION FOR COATING FOOD TO BE COOKED AND PROCESS FOR PRODUCING COOKED FOOD

(75) Inventors: Hideki Komai, Izumisano (JP); Yoko Imamura, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 1145 days.

(21) Appl. No.: 10/522,776

(22) PCT Filed: Aug. 5, 2003

(86) PCT No.: PCT/JP03/09965

§ 371 (c)(1),
(2), (4) Date: Jan. 31, 2005

(87) PCT Pub. No.: WO2004/016090

PCT Pub. Date: Feb. 26, 2004

(65) Prior Publication Data

US 2005/0266127 A1 Dec. 1, 2005

(30) Foreign Application Priority Data

Aug. 6, 2002 (JP) ............................. 2002-229237

(51) Int. Cl.
*A23P 1/08* (2006.01)
(52) U.S. Cl. ...................... 426/302; 426/305; 426/237; 426/523
(58) Field of Classification Search ................. 426/302, 426/305, 523, 237
See application file for complete search history.

(56) References Cited

U.S. PATENT DOCUMENTS 5,139,800 A * 8/1992 Anderson et al. ........... 426/243

5,286,504 A * 2/1994 Sheen et al. ................ 426/243

FOREIGN PATENT DOCUMENTS

| JP | 6-98739 | A | 4/1994 |
| JP | 9-74999 | A | 3/1997 |
| JP | 9-74999 | * | 5/1997 |
| JP | 9-163929 | * | 6/1997 |
| JP | 9-163929 | A | 6/1997 |
| JP | 10-165129 | A | 6/1998 |
| JP | 11-137199 | A | 5/1999 |
| JP | 11-196766 | A | 7/1999 |

OTHER PUBLICATIONS

Schwartzberg, H. G. 1992. Physical Chemistry of Foods, Marcel Dekker, Inc. Table .6.6.*
Anon. 1990. McCutcheon's Emulsifiers & Detergents. McCutcheon's Division. The Manufacturing Confectioner Publishing Co., New Jersey. p. 178-180.*

* cited by examiner

*Primary Examiner*—Carolyn A Paden
(74) *Attorney, Agent, or Firm*—Wenderoth, Lind & Ponack, L.L.P.

(57) ABSTRACT

It is intended to provide a coating fat composition for a food to be cooked and a process for producing a cooked food whereby a fried-like food can be obtained by a simple cooking procedure without frying in oil and thus problems accompanying the frying procedure such as worsening of the working environment and waste oil disposal can be solved. That is, the present invention provides a fat composition for coating a food to be cooked which comprises a fat and an agent for reducing the contact angle of the resulting fat composition to 0.7-times or less the contact angle of a fat having nearly the same slip melting point as the composition, wherein the contact angle is measured at an ambient temperature (in the case of the composition being liquid at ambient temperature) or at a temperature 10° C. higher than the slip melting point (in the case of the composition being semi-solid or solid at ambient temperature); and a process of producing a fried-like food which comprises coating the surface of a food with the fat composition for coating a food to be cooked and then subjecting the food to radiation heating or superheated steam heating.

1 Claim, No Drawings

__US 7,731,999 B2__

FAT COMPOSITION FOR COATING FOOD TO BE COOKED AND PROCESS FOR PRODUCING COOKED FOOD

TECHNICAL FIELD

The present invention relates to a process of producing a fried-like food that is not greasy and has crispy texture, readily and without using a deep frying step. The process comprises coating an unfried food to be cooked with a fat composition for coating a food to be cooked comprising a fat and an agent for imparting hydrophilicity and then subjecting the coated food to radiation heating or superheated steam heating. The presence of the agent for imparting hydrophilicity in the fat composition for coating a food to be cooked reduces the contact angle of said fat composition to 0.7 times or less that of a fat having nearly the same slip melting point as said fat composition, wherein the contact angle is measured at ambient temperature when said composition is in liquid form at ambient temperature or at a temperature 10° C. higher than the slip melting point when said composition is in semi-solid or solid form at ambient temperature.

BACKGROUND ART

Fried foods are typically produced by coating a food material with a batter liquid prepared by dissolving, dispersing or emulsifying flour, starch, fat, a stabilizer, and the like in water, rolling the coated food material in bread crumbs, and then frying it in a frying oil (at about/approx 170 to 180° C.).

Fried foods also include oven cooking-type fried foods, which are produced by pre-frying a food in an oil heated to a high temperature and then freezing it and are intended to be heated with an oven or the like before eating it. For oven cooking-type fried foods, JP-A 11-137199 discloses a production process of a fried food comprising covering the coating surface of a food fried in oil with a liquid oil in order to prevent a decrease in crispiness of the coating caused by the moisture absorption of the coating during frozen storage and the moisture transfer during heating in a microwave oven. In the production process, a food is once fried in oil at a high temperature and then the resulting fried food is covered with a liquid oil.

It is also suggested that a frying oil is permeated into a food material as it is or a food material that is previously seasoned, aged and frozen, or a fat powder or liquid shortening is strewn over the food material, and the resulting food material is heated with saturated steam and then steamed by spraying superheated steam to produce a non-fried processed food (JP-A 11-178513). However, a frying oil used in this method is not particularly limited and the final food thus obtained may be unevenly cooked or may have the dry surface, so that it may be inferior to a oil-fried food in taste. Furthermore, the baking method requires two steps of heating with saturated steam and steaming by spraying a food material with superheated steam. It is also suggested that a food material is rolled in bread crumbs coated with a solid fat in order to suppress the moisture adsorption and the food material then is cooked to prepare meuniere (JP-A 10-229840). However, the food thus obtained is not a fried-like food.

In addition, a fat composition for preparing fried foods is suggested which is a fat composition prepared by adding and dissolving 4.0% by weight or less of an emulsifying agent into a liquid fat, and wherein the interfacial tension between the fat composition and water at 80° C. is 7 mN/m or less 3 seconds after the interface formation (JP-A 2002-101819). This fat composition is directed to production of a fried food and said fried food is produced by adding and dissolving an emulsifying agent into a frying oil and then carrying out a step of frying in the frying oil.

DISCLOSURE OF INVENTION

The present invention relates to a fat composition for coating a food to be cooked and a process of producing a cooked food. An object of the present invention is to provide a process of producing a cooked food, wherein said process can provide a fried-like food by means of a simple cooking procedure without using a deep frying step and can solve problems such as worsening of the working environment, waste oil disposal and the like accompanying a deep frying step.

The present inventors intensively studied in order to solve the above problems and as a result, prepared a fat composition that easily sticks to water-containing dough by adding a certain agent to a fat so as to make the contact angle of the resulting fat composition 0.7 times or less that of a fat having nearly the same slip melting point as said fat composition, wherein the contact angle is measured at ambient temperature when said composition is in liquid form at ambient temperature or at a temperature 10° C. higher than the slip melting point when said composition is in semi-solid or solid form at ambient temperature. The present inventors found that a fried-like food having good texture and taste could be obtained without using a deep frying step and by coating the surface of a fried-like food that is not yet fried in oil with the above fat composition and immediately after that or after chilling or freezing the resultant coated food, baking it with an oven, superheated steam or the like, and thereby completed the present invention. That is, the present invention-provides a fat composition for coating a food to be cooked which comprises a fat and an agent for reducing the contact angle of the resulting fat composition to 0.7 times or less that of a fat having nearly the same slip melting point as the fat composition, wherein the contact angle is measured at ambient temperature when said composition is in liquid form at ambient temperature or at a temperature 10° C. higher than the slip melting point when said composition is in semi-solid or solid form at ambient temperature. The present invention also provides a process of producing a fried-like food which comprises coating the surface of a food with the fat composition for coating a food to be cooked and then subjecting the coated food to radiation heating or superheated steam heating.

BEST MODE FOR CARRYING OUT THE INVENTION

In the present invention, a food to be cooked includes foods coated with coating materials such as batter or/and bread crumbs prior to cooking (i.e., prior to frying in oil, or to be cooked), and fried bakery foods whose base is flour dough, such as fried buns filled with curry paste and fried doughnuts, prior to frying in oil. A fried-like food in the present invention means a cooked food having the texture equal to that of a fried food prepared by frying in oil. Examples thereof include foods equivalent to fries, such as croquettes, fried seafood such as fishes and shrimps, fried vegetables, cutlets such as a fried pork cutlet and a fried cake of minced meat, and the like, and fried foods such as a fried bun filled with curry paste, a doughnut filled with bean paste, piroshki and a corn dog.

A fat composition for coating a food to be cooked in the present invention is not particularly limited as long as the fat composition comprises a fat and an agent for reducing the contact angle of the fat composition to 0.7 times or less that of a fat having nearly the same slip melting point as the fat composition, wherein the contact angle is measured at ambient temperature when said composition is in liquid form at ambient temperature or at a temperature 10° C. higher than the slip melting point when said composition is in semi-solid or solid form at ambient temperature. The reduction of the contact angle can be accomplished by an addition of an emulsifying agent having an HLB of 4 to 12 to a fat. If an emulsifying having an HLB of less than 4 is used, the effect of reducing the contact angle is small and therefore it is difficult to make the contact angle of the fat composition in liquid form measured at ambient temperature or at a temperature 10° C. higher than the melting point (slip point) 0.7 times or less the contact angle of a fat (untreated fat) having nearly the same slip melting point as the fat composition. If an emulsifying agent having an HLB of more than 12 is used, the solubility of the emulsifying agent in a fat is low and thereby it difficult to obtain the effect of the present invention. More preferred is an emulsifying agent having an HLB of 5 to 10. An emulsifying agent is not particularly limited as long as it has an HLB of 4 to 12, preferably 5 to 10, and includes polyglycerin fatty acid ester, organic acid monoglyceride and the like. Instead of or in combination with an emulsifying agent, an addition of MCT (medium chain triglyceride) or ethanol or a combination thereof is expected to have effects of reducing the contact angle and improving workability, in particular lowering the viscosity.

The amount added of an emulsifying agent is suitably from 0.4 to 10% by weight of the amount of a fat. If the amount added of an emulsifying agent is below 0.4% by weight, it is difficult to make the contact angle of the resulting fat composition 0.7 times or less that of a fat having nearly the same slip melting point as said composition, wherein the contact angle is measured at ambient temperature when said composition is in liquid form at ambient temperature or at a temperature 10° C. higher than the slip melting point when said composition is in semi-solid or solid form at ambient temperature. If the amount added of an emulsifying agent is more than 10% by weight, the flavor of the emulsifying agent may negatively affect the fat.

A contact angle is measured as described below. A fat composition for coating a food to be cooked is completely melted at 60° C. or higher and then left for 2 or more hours, depending on the kind of a fat contained in the fat composition, at ambient temperature (about 20° C.±5° C.) when the fat is in liquid form at ambient temperature or at a temperature 10° C. higher than the slip melting point when the fat is in semi-solid or solid form at ambient temperature, to adjust the temperature of the fat composition for coating a food to be cooked to ambient temperature or a temperature 10° C. higher than the slip melting point. Then, with a contact angle measurement apparatus "FACE CONTACT-ANGLEMETER CA-D Model (available from Kyowa Interface Co., Ltd.)", the fat composition for coating a food to be cooked whose temperature is 10° C. higher than the melting point (slip point) of the fat thus obtained is dropped onto dough whose base is weak flour [a commercially available wrapping of dough for jiao-zi (dumpling); water content: about 31%)]] using the special liquid droplet adjustor and the contact angle between the fat composition and the dough is measured. When the fat composition comprises rapeseed oil as a fat, the environmental temperature is suitably from 20 to 21° C. and the environmental humidity is suitably from 20 to 40% during measurement. When a fat composition for coating a food to be cooked is dropped using the special liquid droplet adjustor, a Teflon (trade mark) needle is preferably used as the needle of the special liquid droplet adjustor.

A fat used as a component of the fat composition for coating a food to be cooked of the present invention includes palm oil, rapeseed oil, soybean oil, sunflower oil, corn oil, cottonseed oil, safflower oil, rice bran oil, coconut oil and palm kernel oil, and hardened oils, ester exchanged oils and fractionated oils thereof. The surface of a food is coated with the fat composition for coating a food to be cooked to produce a food to be cooked. The coated food to be cooked may be chilled or frozen after coating. In this case, it is preferable that a fat used as a component of the fat composition for coating a food to be cooked is selected from such fats as prevent the fat composition from oozing during freezing or chilling.

The food to be cooked of the present invention is not fried in oil. The unfried food can be coated with the fat composition for coating a food to be cooked and then heated to produce a fried-like food. The method of heating is a heating method capable of evaporating water in batter adhering to the outside of the unfried food and includes radiation heating, for example, with a cooking stove, an oven, a far infrared radiation or the like, and superheated steam heating. The heating temperature and time are not particularly limited as long as they are enough for water in batter to evaporate and for the surface of a food to be appropriately baked. The heating temperature and heating time may be adjusted depending on the kind and size of a food material, and the temperature of a food (ambient temperature stored food, chilled food, or frozen food). According to the present invention, since a fried-like food can be produced by heating, a deep frying step is not required. Therefore, the present invention has effects of improving the worsening of the working environment due to smelling, oil fouling, etc. during frying in oil, using up fresh oil without wasting and eliminating waste oil.

A method of coating the fat composition for coating a food to be cooked includes a spraying method and an immersing method. In comparison between a fried-like food with the fat composition for coating a food to be cooked of the present invention and a fried-like food with another fat composition or a fat, wherein the amounts of the fat compositions or the fat used in spraying or immersing are the same, there is a significant difference in greasiness of sensory evaluation. For a fried-like food with the fat composition for coating a food to be cooked of the present invention, the sensory evaluation shows that the fried-like food is not greasy even when the amount of the fat composition used in spraying or immersing is as large as the amount of oil absorbed by deep frying. It is also possible to cook using the fat composition of the present invention in an amount as small as 10% to 30% of the oil amount absorbed by deep frying, in spraying or immersing.

EXAMPLES

Hereinafter, the present invention will be specifically set forth by referring to Example. However, the present invention is not limited to Examples.

<Fat Composition for Coating a Food to be Cooked Comprising a Liquid Fat as a Base>

One percent by weight of Polyglycerin fatty acid ester or organic acid monoglyceride having various HLB values was dissolved in refined rapeseed oil (available from Fuji Oil Co., Ltd.) to prepare a fat composition for coating a food to be cooked. Each HLB values and contact angle values (relative angle to that of rapeseed oil) are shown in Table 1.

EXAMPLES AND COMPARATIVE EXAMPLES

The entire surface of a salmon slice coated with bread crumbs was battered and breaded. The resulting salmon slice was immersed in a fat composition for coating a food to be cooked comprising an emulsifying agent and rapeseed oil as shown in Examples 1 to 16 of following Table 1 to stick the fat composition to the surface, and then baked in an oven at 250° C. for 20 minutes. Sensory evaluation of the resulting fried-like food was performed. The results are shown in Table 1.

<Procedure for Preparing Fried Salmon>

Salmon Slice 30 g→Batter 8 g→Bread Crumbs 8 g→Fat Composition 15 g

<Testing for the Amount of Addition of Emulsifying Agent>

Fat compositions for coating a food to be cooked were prepared by adding diglycerin monooleic acid ester (HLB=8) as an emulsifying agent in varying amounts relative to the amount of refined rapeseed oil as indicated in the following Table 2. Then, the contact angles of the resulting fat compositions were measured and sensory evaluation was performed for fried-like foods coated with the fat compositions for coating foods to be cooked. The results are shown in Table 2.

<Preparation Procedure for Sensory Evaluation Sample>

Salmon Slice 30 g→Batter 8 g→Bread Crumbs 8 g→Fat Composition 15 g

After the battered and breaded salmon slice was immersed in the fat composition for coating a food to be cooked to stick

TABLE 1

| Example | Emulsifying agent | HLB | Contact angle | Relative angle (note) | Sensory evaluation of fried salmon | | |
|---|---|---|---|---|---|---|---|
| | | | | | Crispy | Not greasy | Total evaluation |
| 1 | Decaglycerin decaoleic acid ester | 3 | 42.2 | 0.81 | △ | △ | △ |
| 2 | Hexaglycerin pentaoleic acid ester | 4 | 26.0 | 0.49 | ○ | ○ | ○ |
| 3 | Decaglycerin pentaoleic acid ester | 4.5 | 25.2 | 0.48 | ○ | ○ | ○ |
| 4 | Diglycerin monooleic acid ester | 5.5 | 17.2 | 0.33 | ◎ | ◎ | ◎ |
| 5 | Pentaglycerin trioleic acid ester | 7 | 28.5 | 0.54 | ◎ | ◎ | ◎ |
| 6 | Diglycerin monooleic acid ester | 8 | 20.2 | 0.39 | ◎ | ◎ | ◎ |
| 7 | Triglycerin monooleic acid ester | 10 | 21.0 | 0.40 | ◎ | ◎ | ◎ |
| 8 | Hexaglycerin monooleic acid ester | 11 | 26.8 | 0.51 | ○ | ○ | ○ |
| 9 | Decaglycerin monooleic acid ester | 12 | 28.2 | 0.54 | ○ | ○ | ○ |
| 10 | Pentaglycerin monooleic acid ester | 13 | 26.8 | 0.51 | △ | ○ | x Precipitated |
| 11 | Acetylated monostearin | 3 | 43.8 | 0.84 | △ | x | x |
| 12 | Diacetyl tartaric acid monostearin | 9 | 33.0 | 0.63 | ◎ | ○ | ○ |
| 13 | Citric acid monoolein | 8.5 | 22.8 | 0.44 | ◎ | ◎ | ◎ |
| 14 | Succinic acid monoolein | 9 | 25.2 | 0.48 | ◎ | ◎ | ◎ |
| 15 | No addition | | 52.4 | 1.0 | x | x | x |

Evaluations: ◎ excellent, ○ good, △ slightly poor, x poor
Crispy: compared with texture immediately after frying in oil
Total evaluation: A large amount of precipitation of an emulsifying agent after added to a fat: X
Note) relative angle = (contact angle of fat composition/contact angle of fat having similar melting point)

Fried-like foods coated with the fat compositions for a food to be cooked of the present invention were crispy and not greasy, and had good texture.

it to the surface, the slice was baked in an oven at 250° C. for 20 minutes and then the resulting fried-like food was subjected to sensory evaluation.

TABLE 2

|  |  | Example |  |  |  |  |  |  |  |  |  |
|---|---|---|---|---|---|---|---|---|---|---|---|
|  |  | 16 | 17 | 18 | 19 | 20 | 21 | 22 | 23 | 24 | 25 |
|  | Added amount | 0 | 0.1 | 0.3 | 0.5 | 1.0 | 3.0 | 5.0 | 8.0 | 10.0 | 12.0 |
|  | Contact angle | 52.4 | 43.0 | 41.4 | 34.1 | 20.2 | 14.8 | 11.6 | 12.8 | 16.5 | 19.4 |
|  | Relative angle | 1.0 | 0.82 | 0.79 | 0.65 | 0.39 | 0.28 | 0.22 | 0.24 | 0.31 | 0.37 |
| Sensory evaluation | Crispy | x | x | Δ | ○ | ◎ | ◎ | ◎ | ◎ | ◎ | ◎ |
|  | Not greasy | x | Δ | ○ | ◎ | ◎ | ◎ | ◎ | ◎ | ◎ | ◎ |
|  | Flavor | ○ | ○ | ○ | ◎ | ◎ | ◎ | ◎ | ○ | Δ | x |
|  | Total evaluation | x | x | Δ | ○ | ◎ | ◎ | ◎ | ○ | ○ | Δ |

In Examples 16 and 17, gerasiness and crispy texture were not improved. In Example 18, greasiness was reduced, but crispy texture was insufficient. In Example 25, the fat composition had a problem in the flavor due to a negative effect of the emulsifying agent when the amount added of the emulsifying agent exceeded 10% by weight.

<Testing for Coating Amount of Fat Composition>

The croquette composition as described below was prepared using rapeseed oil or a fat composition comprising rapeseed oil and an emulsifying agent (diglycerin monooleic acid ester (HLB=8): 1% addition) of the present invention and then tested for the burnt area and the texture depending on the coating amount. The results are shown in Table 3.

Procedure:

Composition (1) Shape 80 g of food material into round form (mashed potatoe from Snow Brand Milk Products Co., Ltd.: hot water=100:350).
↓
(2) Battering the food material with 30 g of batter liquid (flour:water=100:200).
↓
(3) Breading the food material with 20 g of raw bread crumbs.
↓
(4) Spray the entire surface of the food material with the fat or the fat composition, and then bake it at 250° C. for 18 minutes (for 9 minutes per one side).

TABLE 3

|  |  | Used fat |  | Texture | Burnt area |
|---|---|---|---|---|---|
| Example 26 | Coating fat | 5 g | Slightly dry | Slightly burned |
|  | 27 |  | 10 g | Crispy, Light | Slightly burned |
|  | 28 |  | 15 g | Close to fries, Not greasy | Not burned |
| Example 29 | Refined rapeseed | 5 g | Dry | about ½ |
|  | 30 | oil | 10 g | Less Crispy | about ⅓ |
|  | 31 |  | 15 g | Greasy, Sticky | about ¼ |

Note)
Burnt area means the proportion of the burnt area in the entire surface of a croquette. The evaluation "Slightly burned" means that the burnt area is 1/10 or less of the entire surface and thus has no problem.

When a croquette was fried in refined rapeseed oil under the usual conditions (175° C. for 6 minutes), the fat content in the croquette was about 15 g. Considering this, the coating amount was decreased from 15 g step by step and the texture and the burnt area were examined. The results are shown in the above Table 3.

The croquettes with the coating fat composition were crispy and not greasy. Additionally, since the food surface could be uniformly coated even with a small amount of the coating fat, the resulting food had little burnt area and reduced dry texture even when the coating amount was reduced compared with a case of using rapeseed oil.

<Coating Fat Composition for a Food to be Cooked Comprising a Fat That is in Solid Form at Ambient Temperature as a Base>

Using rapeseed oil, palm olein (iodine value 56, slip melting point 21° C.) or palm mid fraction (iodine value 34, slip melting point 30° C.), the contact angle was measured and the texture of a croquette prepared using it was evaluated. The contact angle was measured at 20° C. for rapeseed oil that is in liquid form at ambient temperature, or at a temperature (the melting point+10° C.) at which the fat becomes liquid for the other fats. The results are shown in Table 4. The procedures for preparation and composition of the croquette was the same as the above.

For the measurement, samples were prepared and the environmental temperature was adjusted, in the same manner as described above. An emulsifying agent was diglycerin monooleic acid ester (HLB 5.5) and the amount added was 1% by weight.

TABLE 4

| Sample | Measurement temperature | Contact angle | Relative angle | Evaluation of croquette |
|---|---|---|---|---|
| Rapeseed oil (no additive) | 20° C. | 52.4 | 0.33 | Greasy, and sticky |
| Rapeseed oil (emulsifier 1%) | 20° C. | 17.2 |  | Crispy, not greasy and not sticky |
| Palm olein (no additive) | 31° C. | 26.2 | 0.43 | Greasy and slightly sticky |
| Palm olein (emulsifying agent 1%) | 31° C. | 11.2 |  | Crispy, not greasy and not sticky |
| Palm mid fraction (no additive) | 40° C. | 21.2 | 0.50 | Greasy and slightly sticky |
| Palm mid fraction (emulsifying agent 1%) | 40° C. | 10.6 |  | Crispy, not greasy and not sticky |

TABLE 4-continued

<Testing for Bun filled with Curry paste (Curry Bun)>

| Composition of dough | [Parts] |
|---|---|
| Hard flour | 80 |
| Weak flour | 20 |
| Alive yeast | 3 |
| Baking powder | 1 |
| Sugar | 12 |
| Salt | 1.5 |
| Dry whole milk | 3 |
| Whole egg | 12 |
| Margarine | 12 |
| Water | 46 |

* Margarine: "Fuji Culture 500 (available from Fuji Oil Co., Ltd.)"

According to the above composition, dough was prepared by a standard method. Then, 30 g of a curry filling was wrapped with 50 g of the dough and dry bread crumbs were stuck to the surface of the dough with water. The breaded dough was then leavened. The resulting leavened dough filled with curry paste was sprayed with about 8 g of a coating fat composition containing 1% by weight of diglycerin monooleic acid ester (HLB 5.5) as an emulsifying agent or with about 8 g of refined rapeseed oil, and then baked in an oven at 200° C. for 20 minutes.

In comparison of the resulting curry buns, the curry bun sprayed with the coating fat composition was crispy, not greasy and not sticky and had good texture, as compared with the curry bun sprayed with refined rapeseed oil.

When bread crumbs were stuck to the dough filled with curry paste by using a batter liquid (flour/water=100/300) in place of water, more bread crumbs could be stuck. After that, the same procedure as described above was performed and a crispier curry bun could be obtained.

A combination use of an emulsifying agent and MCT (medium chain triglyceride) was examined. The viscosity of a fat composition comprising 100, 80, 60 or 0% of refined rapeseed oil and 0, 20, 40 or 100% of MCT was measured. The addition of MCT clearly decreased the viscosity and thereby, very small oil droplets (mist) were formed when the fat composition was sprayed on a food to be cooked and the surface of the food to be cooked could be uniformly coated with the fat composition. The viscosity measurement results are shown in the following table.

| MCT | Rapeseed oil | Viscosity (cSt) |
|---|---|---|
| 0 | 100 | 37.5 |
| 20 | 80 | 31.3 |
| 40 | 60 | 26.2 |
| 100 | 0 | 15.4 |

Measuring device: Cannon-Fenske viscometer (measurment temperature 40° C.)
cSt: centistokes

INDUSTRIAL APPLICABILITY

As described above, for a fat composition for coating a food to be cooked and a process of producing a food to be cooked, a fat composition that easily sticks to water-containing dough can be obtained by adding a certain agent to a fat so that the contact angle of the resulting fat composition can be made 0.7 times or less the contact angle of a fat having nearly the same slip melting point as said fat composition, wherein the contact angle is measured at ambient temperature when said composition is in liquid form at ambient temperature or at a temperature 10° C. higher than the slip melting point when said composition is in semi-solid or solid form at ambient temperature; and a fried-like food having good texture and taste can be obtained without using a deep frying step and by coating the surface of a fried-like food that is not yet fried in oil with the above fat composition and immediately after that or after chilling or freezing the resultant coated food, baking it with an oven, superheated stream or the like.

The invention claimed is:

1. A process of producing a fried-like cooked food without a deep-frying step, which comprises:
   coating the surface of an unfried food with a fat composition for coating a food to be cooked by spraying, or immersing the unfried food in oil containing the fat composition, to obtain a coated unfried food, and
   then subjecting the coated unfried food to radiation heating or superheated steam heating,
   wherein:
   the food to be cooked is coated with a coating material of batter and/or bread crumbs prior to cooking,
   the fat composition consists essentially of a fat and an agent for reducing the contact angle of the resulting fat composition to 0.7 times or less that of a fat having nearly the same slip melting point as the fat composition, and
   the contact angle is measured at ambient temperature when said composition is in liquid form at ambient temperature or at a temperature 10° C. higher than the slip melting point when said composition is in semi-solid or solid form at ambient temperature.

* * * * *